United States Patent
Kim et al.

(10) Patent No.: US 11,775,423 B2
(45) Date of Patent: Oct. 3, 2023

(54) STORAGE DEVICES THAT SUPPORT CACHED PHYSICAL ADDRESS VERIFICATION AND METHODS OF OPERATING SAME

(71) Applicant: Samsung Electronics Co., Ltd., Suwon-si (KR)

(72) Inventors: Dong-Woo Kim, Hwaseong-si (KR); Jae Sun No, Anyang-si (KR); Song Ho Yoon, Yongin-si (KR); Kyoung Back Lee, Hwaseong-si (KR); Wook Han Jeong, Pocheon-si (KR)

(73) Assignee: Samsung Electronics Co., Ltd.

( * ) Notice: Subject to any disclaimer, the term of this patent is extended or adjusted under 35 U.S.C. 154(b) by 209 days.

(21) Appl. No.: 17/222,106

(22) Filed: Apr. 5, 2021

(65) Prior Publication Data

US 2021/0240610 A1 Aug. 5, 2021

Related U.S. Application Data

(63) Continuation of application No. 16/133,778, filed on Sep. 18, 2018, now Pat. No. 10,997,066.

(30) Foreign Application Priority Data

Feb. 20, 2018 (KR) .................. 10-2018-0019784
Jun. 4, 2018 (KR) .................. 10-2018-0064106

(51) Int. Cl.
*G06F 12/02* (2006.01)
*G06F 12/1009* (2016.01)
(Continued)

(52) U.S. Cl.
CPC ...... *G06F 12/0246* (2013.01); *G06F 12/1009* (2013.01); *G06F 12/1408* (2013.01);
(Continued)

(58) Field of Classification Search
CPC ......... G06F 12/0246; G06F 2212/7201; G06F 12/1009; G06F 12/1408; G06F 12/1441;
(Continued)

(56) References Cited

U.S. PATENT DOCUMENTS 7,340,652 B2 3/2008 Jarvis et al.
7,487,303 B2 2/2009 Song et al.
(Continued)

FOREIGN PATENT DOCUMENTS

KR 20080072447 A 8/2008
KR 20130048762 A 5/2013
(Continued)

OTHER PUBLICATIONS

Extended European Search Report corresponding to European Application No. 18196417.2 (dated Mar. 25, 2019).
(Continued)

*Primary Examiner* — Jane W Benner
(74) *Attorney, Agent, or Firm* — Myers Bigel, P.A.

(57) ABSTRACT

A storage device includes a descramble module configured to descramble at least a portion of a read command, which includes logical block address (LBA) information and first meta information, into first signature information and first physical address (PA) information, for accessing a flash memory. A compare module is provided, which is configured to compare the first signature information against stored signature information to thereby determine an equivalency or discrepancy therebetween. An access module is provided, which is configured to use the first PA information to access a data region of the flash memory, upon determination of the equivalency by said compare module.

20 Claims, 14 Drawing Sheets

(51) Int. Cl.
*G06F 12/14* (2006.01)
*G06F 21/79* (2013.01)

(52) U.S. Cl.
CPC .......... *G06F 12/1441* (2013.01); *G06F 21/79* (2013.01); *G06F 2212/7201* (2013.01); *G06F 2212/7205* (2013.01); *G06F 2212/7207* (2013.01); *G06F 2212/7209* (2013.01)

(58) Field of Classification Search
CPC ............. G06F 21/79; G06F 2212/7205; G06F 2212/7207; G06F 2212/7209; G06F 11/1008; G06F 2211/007
See application file for complete search history.

(56) References Cited

U.S. PATENT DOCUMENTS

| | | | |
|---|---|---|---|
| 7,873,878 B2 | 1/2011 | Belluomini et al. | |
| 7,930,588 B2 | 4/2011 | Blount et al. | |
| 8,161,353 B2 | 4/2012 | Flynn et al. | |
| 8,214,684 B2 | 7/2012 | Hetzler et al. | |
| 8,745,309 B2 | 6/2014 | Jung et al. | |
| 8,938,645 B2 | 1/2015 | Schlarb et al. | |
| 2004/0186946 A1 | 9/2004 | Lee | |
| 2011/0191522 A1 | 8/2011 | Condict et al. | |
| 2011/0302474 A1 | 12/2011 | Goss et al. | |
| 2013/0246709 A1 | 9/2013 | Segelken et al. | |
| 2016/0147651 A1 | 5/2016 | Desai et al. | |
| 2016/0277733 A1 | 9/2016 | Li et al. | |
| 2016/0344731 A1* | 11/2016 | Serebrin | H04L 63/164 |
| 2017/0192902 A1 | 7/2017 | Hwang et al. | |
| 2018/0024751 A1 | 1/2018 | Bandic et al. | |
| 2018/0275920 A1* | 9/2018 | Koo | G06F 3/0673 |
| 2019/0121576 A1 | 4/2019 | Jean | |

FOREIGN PATENT DOCUMENTS

| | | |
|---|---|---|
| WO | 2008093961 A1 | 8/2008 |
| WO | 2017066601 A1 | 4/2017 |

OTHER PUBLICATIONS

Search Report and Written Opinion for corresponding Singaporean Application No. 10201900022Y (8 pages) (dated Jul. 8, 2019).

* cited by examiner

FIG. 4

| | |
|---|---|
| LBA#10 | PA#10=20 |
| LBA#9 | PA#9=19 |
| LBA#8 | PA#8=18 |
| LBA#7 | PA#7=17 |
| LBA#6 | PA#6=16 |

2544

META REGION 2

SGN_D2 = 5

| | |
|---|---|
| LBA#5 | PA#5=15 |
| LBA#4 | PA#4=14 |
| LBA#3 | PA#3=13 |
| LBA#2 | PA#2=12 |
| LBA#1 | PA#1=11 |

2542

META REGION 1

SGN_D1 = 1

STORAGE DEVICES THAT SUPPORT CACHED PHYSICAL ADDRESS VERIFICATION AND METHODS OF OPERATING SAME

REFERENCE TO PRIORITY APPLICATIONS

This application is a continuation of and claims priority to U.S. application Ser. No. 16/133,778, filed Sep. 18, 2018, which claims priority under 35 U.S.C. § 119 to Korean Patent Application Nos. 10-2018-0019784, filed Feb. 20, 2018, and 10-2018-0064106, filed Jun. 4, 2018, in the Korean Intellectual Property Office, the disclosures of which are hereby incorporated herein by reference in their entirety.

BACKGROUND

1. Field of the Disclosure

The present disclosure relates to storage devices and methods of operating same.

2. Description of the Related Art

In order to read data stored in a storage device including a flash memory, a host may transfer a logical block address (LBA) of the data to be read to the storage device. Then, after the storage device converts the LBA received from the host into a physical address (PA) for accessing the flash memory, for example, using an FTL (Flash Translation Layer), the storage device may provide the data, which is addressed to the PA, to the host.

In another situation, the host may include a cache table to cache information about the PA used in the storage device. Based on this configuration, the host transmits the LBA and the cached PA mapped to the LBA to the storage device, and the storage device may directly access the flash memory, using the cached PA received from the host, without requiring conversion of the LBA into the PA.

However, in this latter situation, since the PA cached in the host is not guaranteed to always be valid, the storage device needs to check whether the PA received from the host has a valid value in a LBA-PA mapping relation.

SUMMARY

Aspects of the present disclosure provide a storage device for checking the validity of a cached PA provided from a host in a simple and efficient manner, in an architecture in which a host caches a PA (Physical Address) of a storage device.

Aspects of the present disclosure also provide a method for operating a storage device for checking the validity of a cached PA provided from a host in a simple and efficient manner, in an architecture in which the host caches the PA of the storage device.

The aspects of the present disclosure are not restricted those mentioned above and another aspect which is not mentioned will be clearly understood by a person skilled in the art from the description below.

According to an aspect of the present disclosure, there is provided a storage device including a descramble module which receives a read command including logical block address (LBA) information and first meta information from a host, and descrambles the first meta information to acquire first signature information and first physical address (PA) information for accessing a flash memory. A compare module is provided to compare a value of the first signature information with a value of second signature information (e.g., stored in advance) to determine whether or not the value of the first signature information and the value of second signature information are equal to each other. An access module is provided, which accesses a data region of the flash memory, using the first PA information, when the value of the first signature information and the value of the second signature information are equal to each other.

According to another aspect of the present disclosure, there is provided a storage device including a descramble module which receives a read command including logical block address (LBA) information and first meta information from a host, and descrambles the first meta information to acquire first signature information and first physical address (PA) information for accessing a flash memory. A compare module is provided, which compares a value of the first signature information with a value of second signature information stored in advance to determine the validity of the first PA information.

According to another aspect of the present disclosure, there is provided a storage device including a descramble module which receives a read command including logical block address (LBA) information and first meta information from a host, and descrambles the first meta information to acquire first signature information and first physical address (PA) information for accessing a flash memory. A compare module is provided, which compares a value of the first signature information with a value of second signature information in a meta region of the flash memory to determine validity of the first PA information.

According to another aspect of the present disclosure, there is provided a method for operating a storage device, which includes receiving a read command including logical block address (LBA) information and first meta information from a host, and descrambling the first meta information to acquire first signature information and first physical address (PA) information for accessing the flash memory. An operation is also performed to compare a value of the first signature information with a value of the second signature information stored in advance to determine validity of the first PA information.

BRIEF DESCRIPTION OF THE DRAWINGS

The above and other aspects and features of the present disclosure will become more apparent by describing in detail example embodiments thereof with reference to the attached drawings, in which:

FIG. 4 is a schematic diagram for explaining an embodiment of a meta region of FIG. 2;

DETAILED DESCRIPTION OF THE EMBODIMENTS

Figure 1:
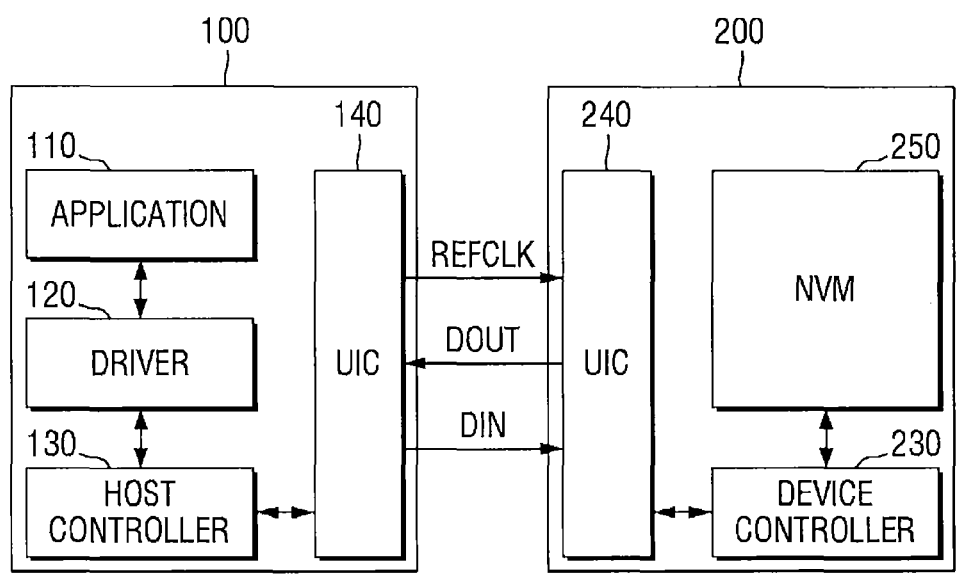
FIG. 1 is a block diagram that illustrates a semiconductor system according to an embodiment of the present disclosure.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram for explaining a semiconductor system according to an embodiment of the present disclosure. Referring to FIG. 1, a semiconductor system 1 according to an embodiment of the present disclosure includes a host 100 and a storage device 200. In some embodiments of the present disclosure, the host 100 and the storage device 200 may be connected to each other through an electric interface, such as a UFS (Universal Flash Storage), SCSI (Small Computer System Interface), SAS (Serial Attached SCSI), SATA (Serial Advanced Technology Attachment), PCIe (Peripheral Component Interconnect Express), eMMC (embedded MultiMediaCard), FC (Fiber Channel), ATA (Advanced Technology Attachment), IDE (Integrated Drive Electronics), USB (Universal Serial Bus), and IEEE 1394 (Firewire). However, the scope of the present disclosure is not limited thereto, and may be applied to another type of interface that allows data to be transmitted and received between the host 100 and the storage device 200.

Hereinafter, for the sake of clarity and convenience of explanation throughout the core of the present disclosure, the description will be given assuming that the host 100 and the storage device 200 are electrically coupled/connected to each other via the UFS electrical interface, the host 100 is a UFS host, and the storage device 200 is a UFS memory device, but the scope of the present disclosure is not limited thereto and is applicable to other types of storage, which use other types of interfaces including the above-described electrical interface.

As shown by FIG. 1, the host 100 includes an application 110, a driver 120, a host controller 130, and a UIC (Universal Flash Storage Interconnection Layer) 140, which operates as a host interface. In some embodiments of the present disclosure, the host 100 may further include a buffer memory. The buffer memory may be used as a main memory of the host 100, and/or may be used as a cache memory, a temporary memory or the like for temporarily storing the data. In some embodiments of the present disclosure, the buffer memory may include volatile memory including DRAM (Dynamic Random Access Memory), but the scope of the present disclosure is not limited thereto.

The application 110 may control the semiconductor system 1 on the basis of a set of commands which is executed by the host 100 and can be used in the semiconductor system 1. The driver 120 may drive the storage device 200 connected to the host 100. For example, the driver 120 may: (i) receive a command for controlling the storage device 200 from the application 110, (ii) process the command using the host controller 130, and then (iii) provide the processing result thereof to the application 110. The application 110 and the driver 120 may be implemented in hardware or software, or as a combination of hardware/software, but the scope of the present disclosure is not limited thereto.

The host controller 130 controls the overall operation inside the host 100. For example, the host controller 130 may transmit the data stored in the buffer memory to the storage device 200 through the host interface 140, in response to a write command received from the driver 120. Further, the host controller 130 may also receive data from the storage device 200 through the host interface 140, in response to a read command received from the driver 120.

The host interface 140 may exchange data with the UIC 240 corresponding to the device interface of the storage device 200 through the data lines DIN, DOUT. Alternatively, the host interface 140 may provide the UIC 240 of the storage device 200 with a reference clock REFCLK that may be used for at least a partial operation of the storage device 200. In some embodiments of the present disclosure, the UIC 140 of the host 100 and the UIC 240 of the storage device 200 handle the connection between the host 100 and the storage device 200 and may adopt, for example, MIPI UniPro or MIPI M-PHY.

As shown, the storage device 200 can include a device controller 230, a UIC 240, and a non-volatile memory (NVM) 250. The device controller 230 controls the overall operation inside the device 230. For example, the device controller 230 may perform operations of writing, reading or erasing the data requested by the host 100 for the non-volatile memory 250. Therefore, like the host 100, the storage device 200 may further include a buffer memory.

The non-volatile memory 250 may include a flash memory, an MRAM (Magnetoresistive Random Access Memory), a PRAM (Phase-change Random Access Memory), FeRAM (Ferroelectric Random Access Memory) and the like, but the scope of the present disclosure is not limited thereto. However, for the sake of convenience of explanation, the non-volatile memory 250 will be described as having a flash-type memory architecture.

Figure 2:
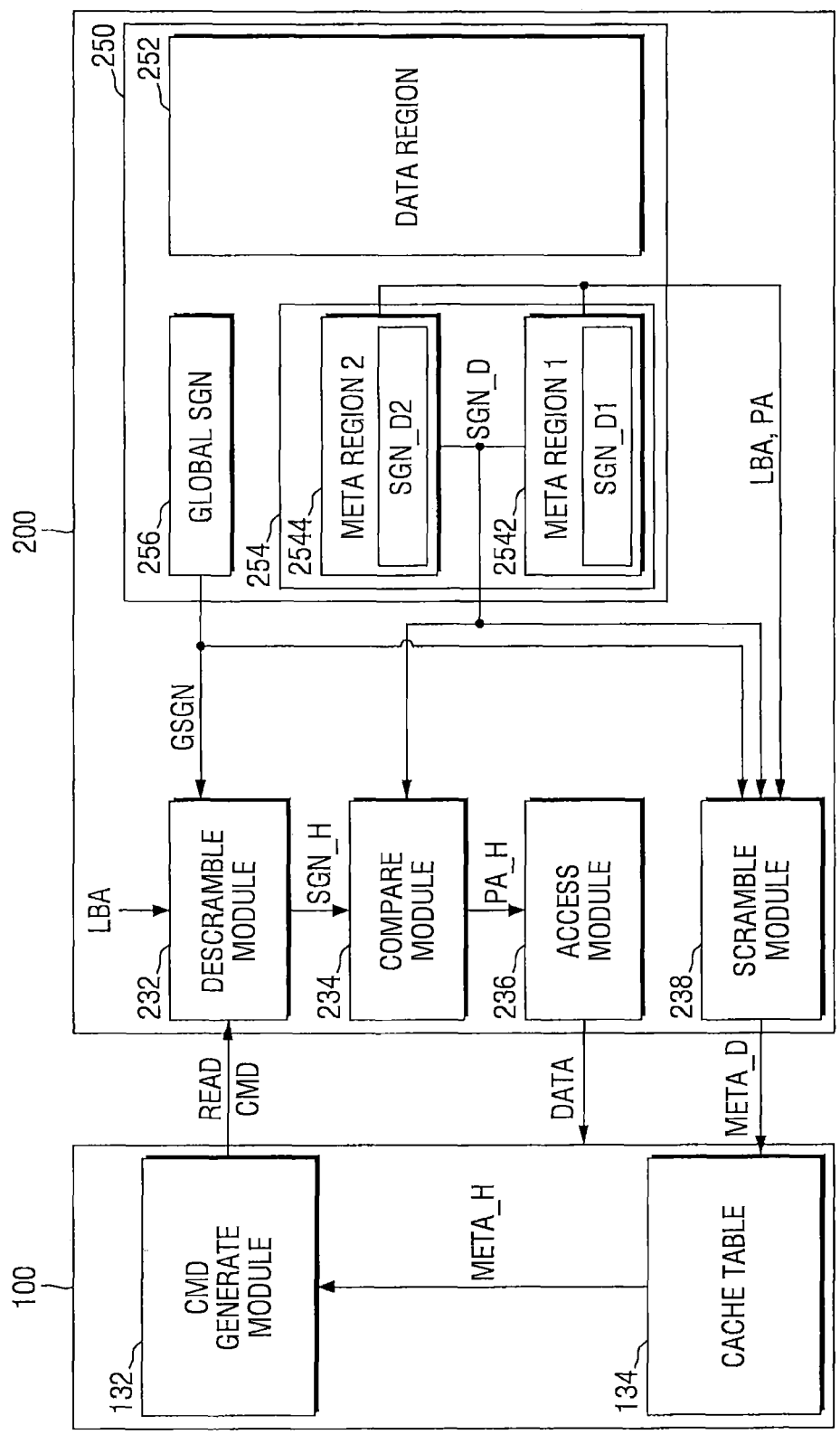
FIG. 2 is a detailed block diagram that illustrates a host and a storage device according to an embodiment of the present disclosure.
Figure 3:
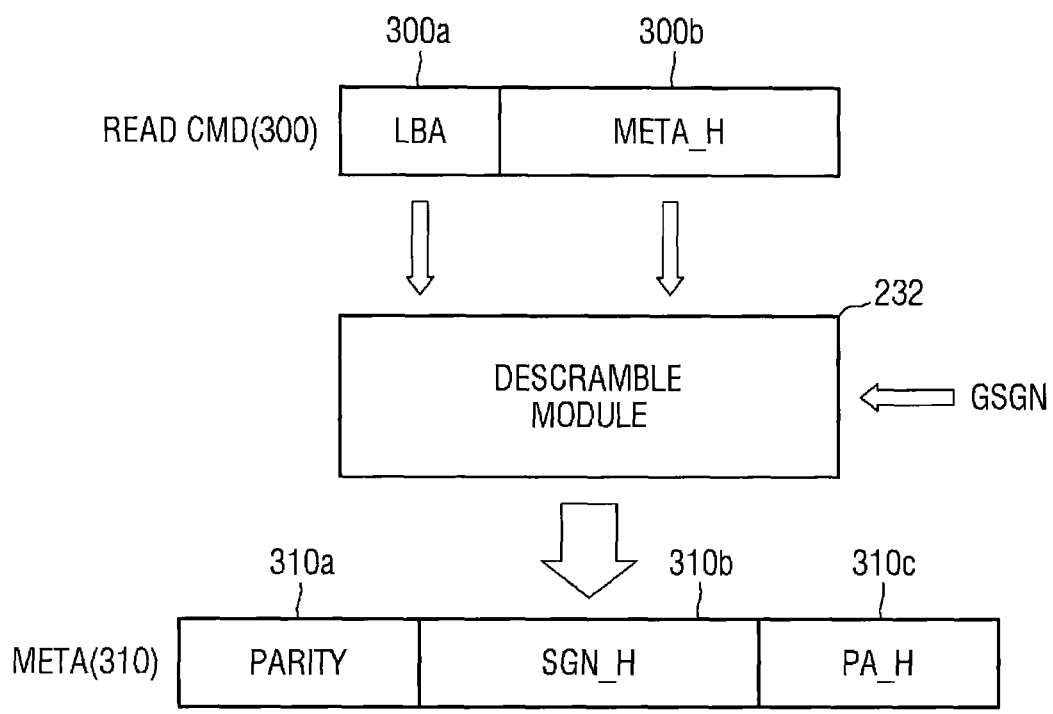
FIG. 3 is a schematic diagram that illustrates a sequence of operations performed by the host and storage device of FIG. 2, according to embodiments of the present disclosure.
Figure 5:
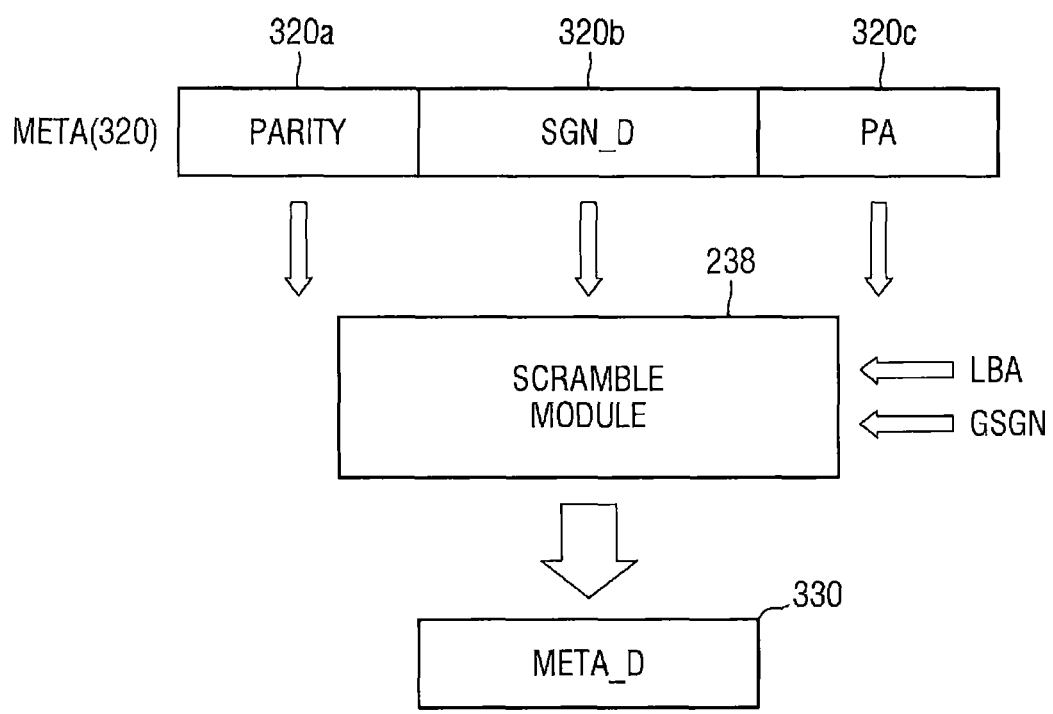
FIG. 5 is a schematic diagram that illustrates operations performed by the scramble module of FIG. 2.

FIG. 2 is a block diagram for explaining a host and a storage device according to an embodiment of the present disclosure. FIG. 3 is a block diagram for explaining an operation example of the descramble module 232 of FIG. 2. FIG. 4 is a block diagram for explaining an embodiment of the meta region 254 of FIG. 2. And, FIG. 5 is a block diagram for explaining an operation example of the scramble module 238 of FIG. 2.

Referring to FIG. 2, the host 100 according to an embodiment of the present disclosure includes a command generate module 132 and a cache table 134.

In some embodiments of the disclosure, the command generate module 132 may be implemented as part of the host controller 130 of FIG. 1, but the scope of the disclosure is not limited thereto, and the command generate module 132 may be implemented as a separate module electrically connected to the host controller 130. On the other hand, in some embodiments of the present disclosure, the cache table 134 is loaded into the buffer memory described in FIG. 1, and the host controller 130 or the command generate module 132 may access the cache table 134 through the buffer memory.

The command generate module 132 generates a data access command including, for example, a read command READ CMD and a write command WRITE CMD, and transmits the data access command to the storage device 200. For example, the read command READ CMD corresponds to a command to provide data stored in the flash memory 250 of the storage device 200 to the host 100, and the write command WRITE CMD corresponds to a command to store the data, which is provided to the device 200 together with the write command WRITE CMD by the host 100, to the flash memory 250.

Specifically, when the command generate module 132 transmits the read command READ CMD to the storage device 200, the read command READ CMD includes LBA (Logical Block Address) information on the data that the host 100 intends to read. For example, in order for the host 100 to read the data addressed to the LBA #5, when the host 100 transmits the LBA information having the value of LBA #5 as the read command READ CMD to the device 200, the device 200 determines the actual PA (Physical Address), which is mapped to the LBA #5, and accesses the flash memory 250 based on the PA.

The PA information mapped to the LBA information in this way is cached through the cache table 134 of the host 100. For example, when PA #5 mapped to LBA #5 is determined as a value of 15 in the device 200, the device 200 may provide information, in which the PA #5 mapped to LBA #5 is 15, to the host 100. Then, the host 200 inserts information, in which PA #5 mapped to LBA #5 is 15, into the cache table 134. Thereafter, when generating the read command READ CMD for reading the data addressed to the LBA #5, the command generate module 132 of the host 200 may include the information on PA #5 of 15 in the read command READ CMD, and may transmit the information to the device 200. In this way, the device 200 that has received the cached PA information on the host 100 may directly and advantageously use the cached PA information, but without requiring conversion of LBA into PA in order to access the data.

However, the cache table 134 managed in the host 100 may not always have latest LBA-PA mapping information. For example, while the value of PA #5 mapped to LBA #5 is cached in the cache table 134, the LBA-PA mapping relation of the device 200 may change as much as possible. Therefore, when the device 200 receives the provision of the cached PA information from the host 200, it is necessary to determine the validity of the cached PA information.

Referring to FIG. 2 and FIG. 3, in combination, to this end (i.e., determining validity), in the present embodiment, the command generate module 132 generates a read command READ CMD including LBA information LBA, 300a and first meta information META_H, 300b. Here, the LBA information LBA includes an LBA value of data to be read by the host 100, for example, the value of LBA #5.

The first meta information META_H is input in the cache table 134, and then may be provided to the command generate module 132. The first meta information META_H includes first signature information SGN_H and first PA information PA_H. In particular, the first signature information SGN_H may include a value used for the device 200 to determine the validity of the first PA information PA_H, and the first PA information PA_H includes the PA value mapped to the LBA information LBA.

In the present embodiment, the first meta information META_H is scrambled data generated by scrambling the first signature information SGN_H and the first PA information PA_H, and may be generated in the device 200 and transmitted to the host 100. Therefore, the command generate module 132 transmits the read command READ CMD including the LBA information LBA and the first meta information META_H provided from the cache table 134 to the device 200.

Alternatively, the storage device 200 according to an embodiment of the present disclosure includes a descramble module 232, a compare module 234, an access module 236, and a scramble module 238. And, in some of these embodiments, the descramble module 232, the compare module 234, the access module 236 and the scramble module 238 may be implemented as a part of the device controller 230, but the scope of the present disclosure is not limited thereto, and they may be implemented as another module electrically connected to the device controller 230.

The descramble module 232 receives the read command READ CMD from the host 100, and descrambles the first meta information META_H included in the read command READ CMD to acquire the first signature information SGN_H and the first PA information PA_H for accessing the flash memory 250. For example, as shown by FIG. 3, the descramble module 232 may use the LBA information LBA and global signature information GSGN (described hereinbelow) to descramble the first meta information META_H. However, in some embodiments of the present disclosure, the meta data 310 in which the first meta information META_H is descrambled may further include parity information 310a, in addition to the first signature information SGN_H 310b and the first PA information PA_H 310c.

The compare module 234 (see, e.g., FIG. 2) compares the value of the first signature information SGN_H with the value of the previously stored second signature information SGN_D to determine the validity of the first PA information PA_H. To this end, in some embodiments of the present disclosure, the compare module 234 may compare the value of the first signature information SGN_H with the value of the previously stored second signature information SGN_D to determine whether the values are equal to each other.

Specifically, when the value of the first signature information SGN_H is equal to the value of the second signature information SGN_D, the compare module 234 may determine that the value of the first PA information PA_H is valid. Alternatively, when the value of the first signature information SGN_H and the value of the second signature information SGN_D are different from each other, the compare module 234 may determine that the value of the first PA information PA_H is invalid.

When it is determined that the first PA information PA_H is valid, the access module 236 may access the data region 252 of the flash memory 250, using the first PA information PA_H. But, when it is determined that the first PA information PA_H is invalid, the access module 236 loads the second PA information from the flash memory 250, and may access the data region 252, using the second PA information.

In particular, when the value of the first signature information SGN_H and the value of the second signature information SGN_D are equal to each other, the access module 236 may access the data region 252 of the flash memory 250, using the first PA information PA_H. But, when the value of the first signature information SGN_H and the value of the second signature information SGN_D are different from each other, the access module 236 may load the second PA information from the flash memory 250 and may access the data region 252, using the second PA information. Advantageously, by comparing the value of the first signature information SGN_H with the second signature information SGN_D in this manner, it is possible to inspect the validity of the cached PA in a simple and highly efficient manner.

The scrambling module 238 scrambles the second signature information SGN_D and the second PA information to generate second meta information META_D. That is, the scrambling module 238 may provide the second signature information SGN_D stored in the device 200 at that time and the efficient second PA information, as the second meta information META_D, to the cache table 134 of the host 100.

In particular, referring to FIG. 5 together, the scrambling module 238 may use the LBA information LBA and the global signature information GSGN to be described later to scramble the second signature information SGN_D and the second PA information PA. On the other hand, in some embodiments of the present disclosure, the metadata 320 to be scrambled may further include parity information, in addition to the second signature information SGN_D and the second PA information PA.

The second signature information SGN_D may be stored in the meta region 254 of the flash memory 250. In this case, the compare module 234 may compare the value of the first signature information SGN_H with the value of the second signature information SGN_D stored in the meta region 254 to determine whether the values are equal to each other.

Referring now to FIGS. 1-4, the meta region 254 may include a plurality of meta regions, for example, a first meta region 2542 and a second meta region 2544. The first meta region 2542 may store the first meta region signature information SGN_D1 of the first LBA set. In other words, the first meta region 2542 may store first meta region signature information SGN_D1 having the same value (e.g., 1) in the first LBA set including LBA #1 to LBA #5. Also, the first meta region signature information SGN_D1 may also have the same value in PA #1 to PA #5 corresponding to LBA #1 to LBA #5.

The second meta region 2544 may store the second meta region signature information SGN_D2 of the second LBA set, which is distinguished from the first LBA set. In other words, the second meta region 2544 may store the second meta region signature information SGN_D2 having the same value (e.g., 5) in the second LBA set including LBA #6 to LBA #10. Also, the second meta region signature information SGN_D2 may also have the same value in PA #6 to PA #10 corresponding to LBA #6 to LBA #10.

The second signature information SGN_D stored in advance in the device 200 may be determined as the first meta region signature information SGN_D1 or the second meta region signature information SGN_D2 in accordance with the value of the LBA information LBA. For example, when the LBA information LBA corresponds to LBA #5, the second signature information SGN_D may be determined as the first meta region signature information SGN_D1, and when the LBA information LBA corresponds to LBA #8, the second signature information SGN_D may be determined as the second meta region signature information SGN_D2.

In some embodiments of the present disclosure, the host 100 and the device 200 may transmit and receive the data access commands and the data to and from each other through the data lines DIN, DOUT described in FIG. 1. The operation of the storage device 200 according to various embodiments of the present disclosure will be described referring now to the embodiments of FIGS. 6 through 14.

Figure 6:
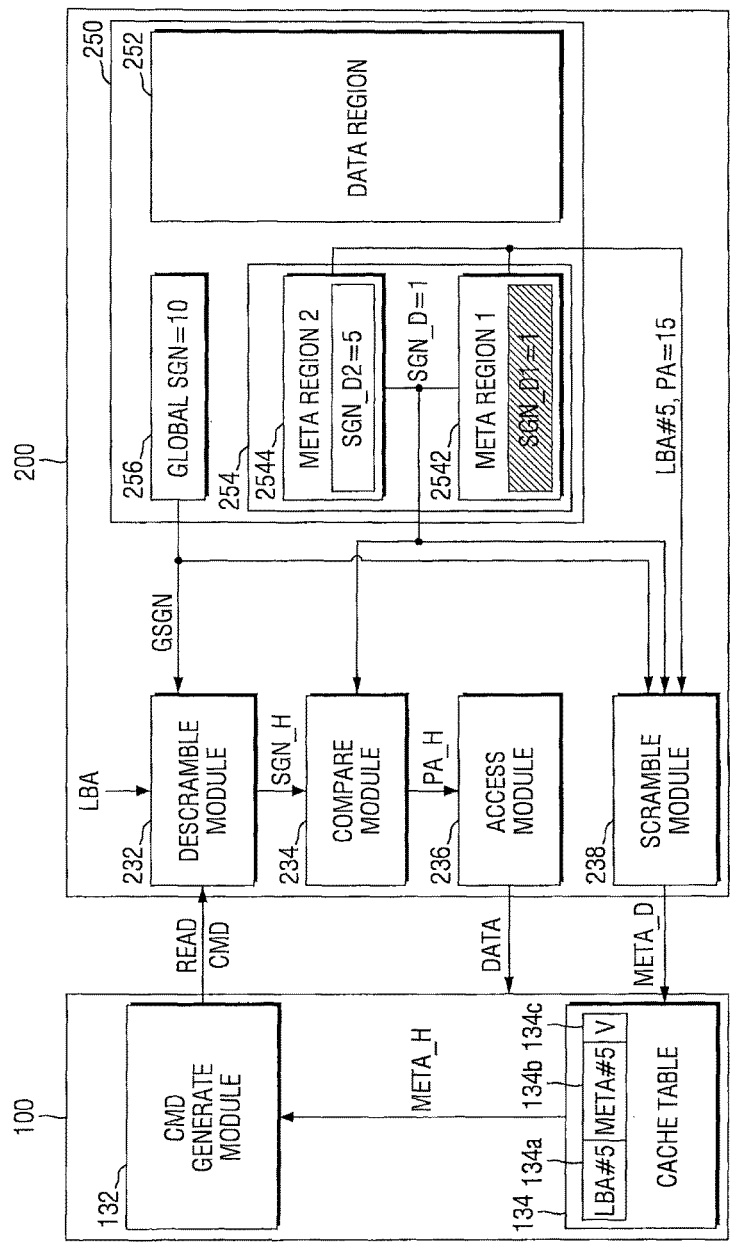
FIG. 6 is a block diagram that illustrates a configuration and operation of a host and a storage device according to an embodiment of the present disclosure.

FIG. 6 is a block diagram for explaining the operation of the host and the storage device according to an embodiment of the present disclosure. Referring to FIG. 6, in the present embodiment, the storage device 200 may generate the second meta information META_D of the LBA #5 and provide it to the cache table 134 of the host 100. First, it is assumed that the first meta region 2542 in the meta region 254 of the storage device 200 is a meta region corresponding to LBA #5. The scramble module 238 scrambles the first meta region signature information SGN_D1 (i.e., the second signature information SGN_D) of the first meta region 2542 and the second PA information to generate the second meta region information META_D.

For example, when the value of the first meta region signature information SGN_D1 of the first meta region 2542 on the current storage device 200 is 1 and the value of the second PA information stored in the first meta region 2542 is 15, the scramble module 238 performs scrambling on the assumption that the value of 15 of PA #5 mapped to LBA #5 is valid.

In particular, as described above, the scramble module 238 may generate the second meta information META_D, using the LBA information and the global signature information GSGN having a value of 10 together.

The second meta information META_D generated by the scramble module 238 may be transmitted to the host 100 and inserted into the cache table 134. As illustrated in FIG. 6, the cache table 134 may include a record including an LBA field 134a, a meta information field 134b, and a validity flag field 134c, but the scope of the present disclosure is not limited thereto, and the internal form of the record may be various. In the present embodiment, the validity flag field 134c has a first value (for example, "V") in the sense that META #5 stored in the cache table 134 together with LBA #5 has the valid value.

Figure 7:
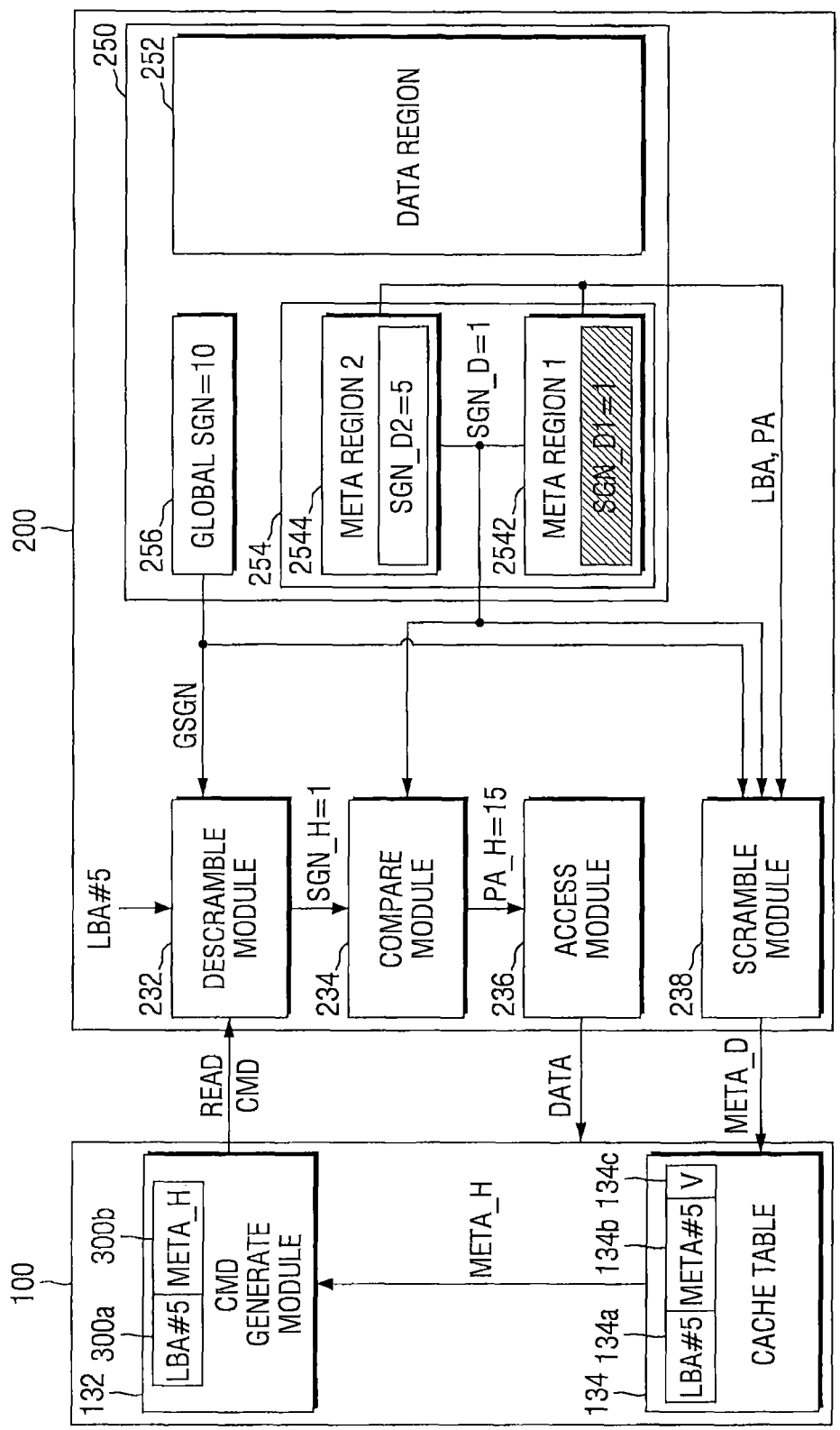
FIG. 7 is a block diagram that illustrates a configuration and operation of the host and the storage device according to an embodiment of the present disclosure.

FIG. 7 is a block diagram for explaining the operation of the host and the storage device according to the embodiment of the present disclosure. Referring to FIG. 7, in the present embodiment, the command generate module 132 of the host 100 generates the read command READ CMD including the LBA information 300a of the LBA #5 and the first meta information META_H, 300b provided from the cache table 134. Further, the command generate module 132 transmits the read command READ CMD to the storage device 200.

The descramble module 232 of the storage device 200 receives the read command READ CMD from the host 100, and descrambles the first meta information META_H to acquire the first signature information SGN_H and the first PA information PA_H for accessing the flash memory 250. In the present embodiment, it is assumed that the value of the first signature information SGN_H acquired by descrambling the first meta information META_H is 1, and the value of the first PA information PA_H is 15.

The compare module 234 of the storage device 200 compares the value of the first signature information SGN_H acquired by descrambling the first meta information META_H with the value of the second signature information SGN_D stored in advance. In this embodiment, assuming that the first meta region 2542 in the meta region 254 is a meta region corresponding to LBA #5, the compare module 234 compares 1 as the value of the first signature information SGN_H with 1 as the value of the first meta region signature information SGN_D1 (i.e., the second signature information META_H) to determine the validity of the first PA information PA_H acquired by descrambling the first meta information META_H.

Since the value of the first signature information SGN_H is the same as the value of the second signature information SGN_D, the access module 236 of the storage device 200 considers that the first PA information PA_H acquired by descrambling the first meta information META_H is valid, accesses the data region 252 of the flash memory 250 using the same, and transmits the accessed data to the host 100.

Figure 8:
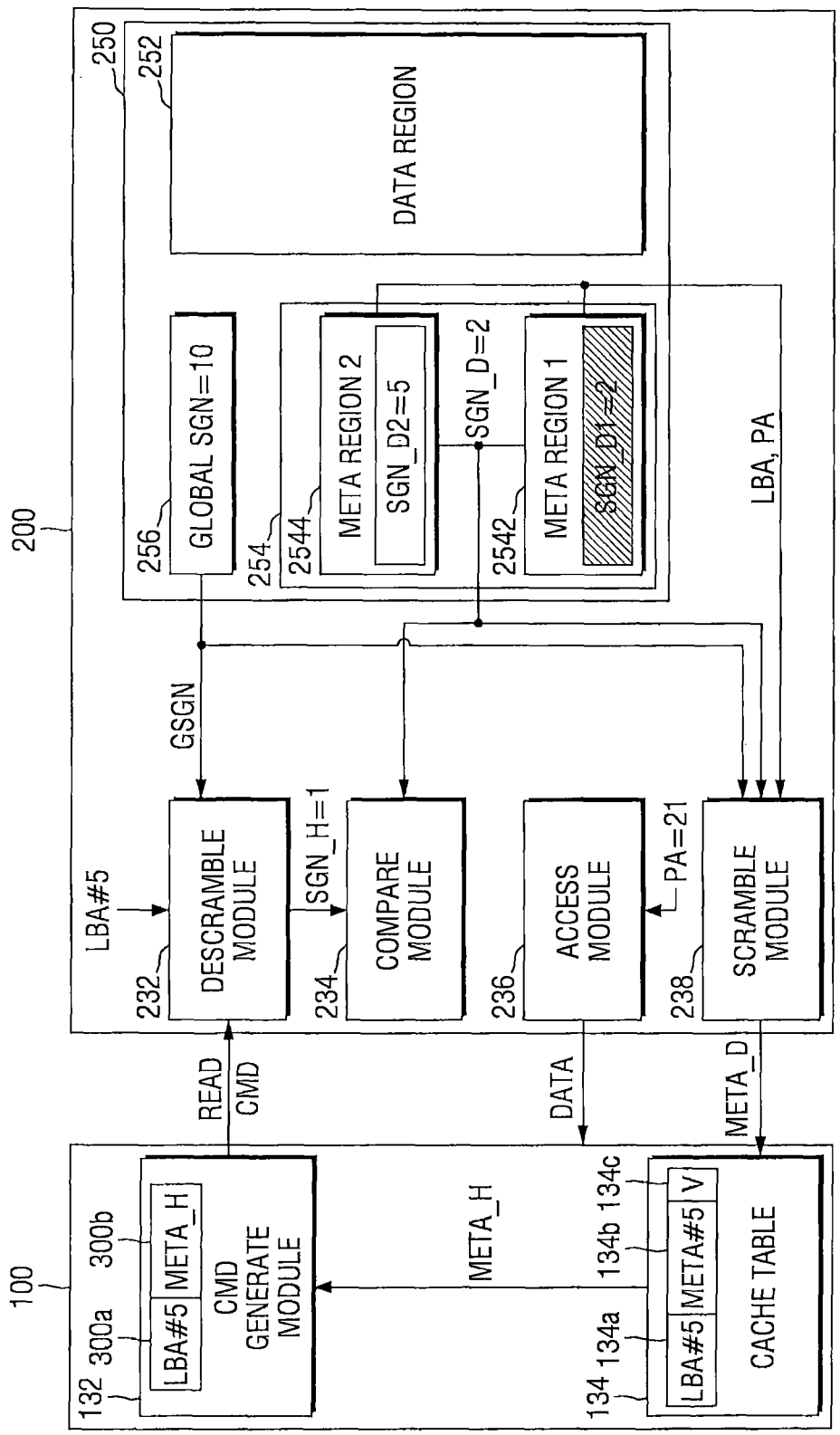
FIG. 8 is a block diagram that illustrates a configuration and operation of the host and the storage device according to an embodiment of the present disclosure.

FIG. 8 is a block diagram for explaining the operation of the host and the storage device according to the embodiment of the present disclosure. Referring to FIG. 8, this embodiment is different from the embodiment of FIG. 7 in that the value of the second signature information SGN_D is changed to 2. As a reason for change in the value of the second signature information SGN_D, for example, there is a situation where the host 100 transmits the write command WRITE CMD to the storage device 200, a case where garbage collection is performed inside the storage device 200 and the like. This will be described later with reference to FIGS. 9 to 14.

Similarly to the embodiment of FIG. 7, the command generate module 132 of the host 100 generates the read command READ CMD including the LBA information 300a of the LBA #5 and the first meta information META_H, 300b provided from the cache table 134, and transmits the read command READ CMD to the storage device 200.

The descramble module 232 of the storage device 200 receives the read command READ CMD from the host 100, and descrambles the first meta information META_H to acquire the first signature information SGN_H, and the first PA information PA_H for accessing the flash memory 250. In the present embodiment, it is assumed that the value of the first signature information SGN_H acquired by descrambling the first meta information META_H is 1, and the value of the first PA information PA_H is 15.

The compare module 234 of the storage device 200 compares the value of the first signature information SGN_H acquired by descrambling the first meta information META_H with the value of the second signature information SGN_D stored in advance. In this embodiment, assuming that the first meta region 2542 in the meta region 254 is a meta region corresponding to LBA #5, the compare module 234 compares 1 as the value of the first signature information SGN_H with the 1 as the first meta region signature information SGN_D1 (i.e., the second signature information SGN_D) to determine the validity of the first PA information PA_H acquired by descrambling the first meta information META_H.

Since the value of the first signature information SGN_H and the value of the second signature information SGN_D are different from each other, the access module 236 of the storage device 200 considers that the first PA information PA_H acquired by descrambling the first meta information META_H is invalid. As a result, the access module 236 accesses the data region 252, using the second PA information newly loaded from the flash memory 250, instead of the first PA information PA_H, and transmits the accessed data to the host 100.

Figure 9:
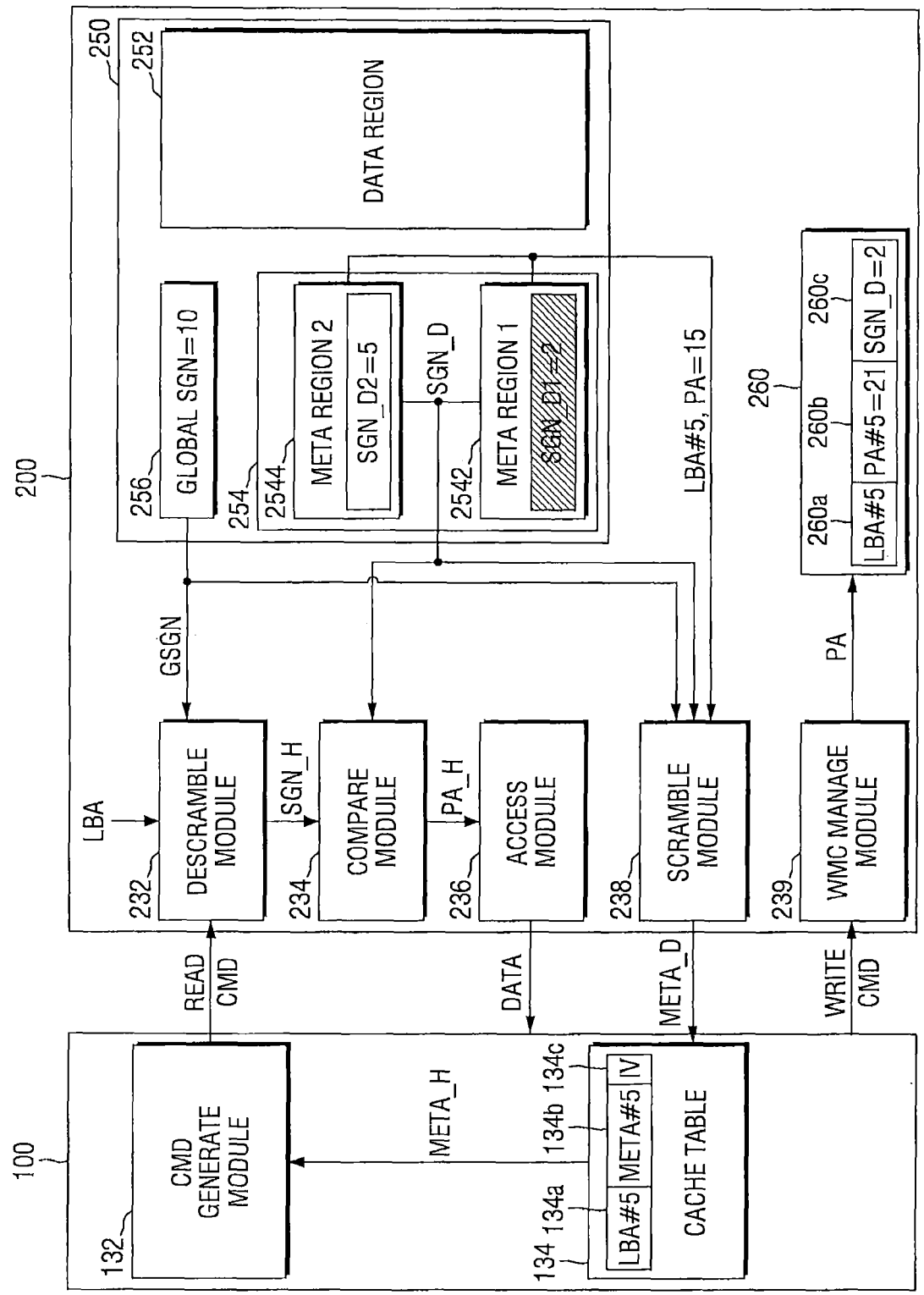
FIG. 9 is a block diagram that illustrates a configuration and operation of the host and the storage device according to an embodiment of the present disclosure.

FIG. 9 is a block diagram for explaining the operation of the host and the storage device according to the embodiment of the present disclosure. Referring to FIG. 9, in the present embodiment, the host 100 may transmit a write command WRITE CMD to the storage device 200. For example, the host 100 may transmit the LBA information of the data to be written and the data to be written to the storage device 200.

In such a case, since the LBA-PA mapping relation which was defined inside the storage device 200 is newly formed, the host 100 may invalidate the cached record, by changing the validity flag field 134c of the record in the cache table 134 to a second value (e.g., "IV"), while transmitting the write command WRITE CMD to the storage device 200.

In the present embodiment, the storage device 200 further includes a WMC management module 239. The WMC management module 239 is a module that manages the PA information and the signature information associated with the LBA information contained in the write command WRITE CMD, using the write map cache (WMC) table 260, when receiving the write command WRITE CMD from the host 100.

For example, when the write command WRITE CMD of LBA #5 is received from the host 100, the WMC management module 239 inserts the value of PA #5 newly determined while being associated with LBA #5, and the value obtained by changing (for example, increasing by 1) the first meta region signature information SGN_D1 of the first meta region 2542 corresponding to LBA #5, into the write map cache table 260. As illustrated in FIG. 9, the write map cache table 260 may include a record including an LBA field 260a, a PA field 260b and a second signature information field 260c, but the scope of the present disclosure is not limited thereto, and the internal form of the record may be various.

Figure 10:
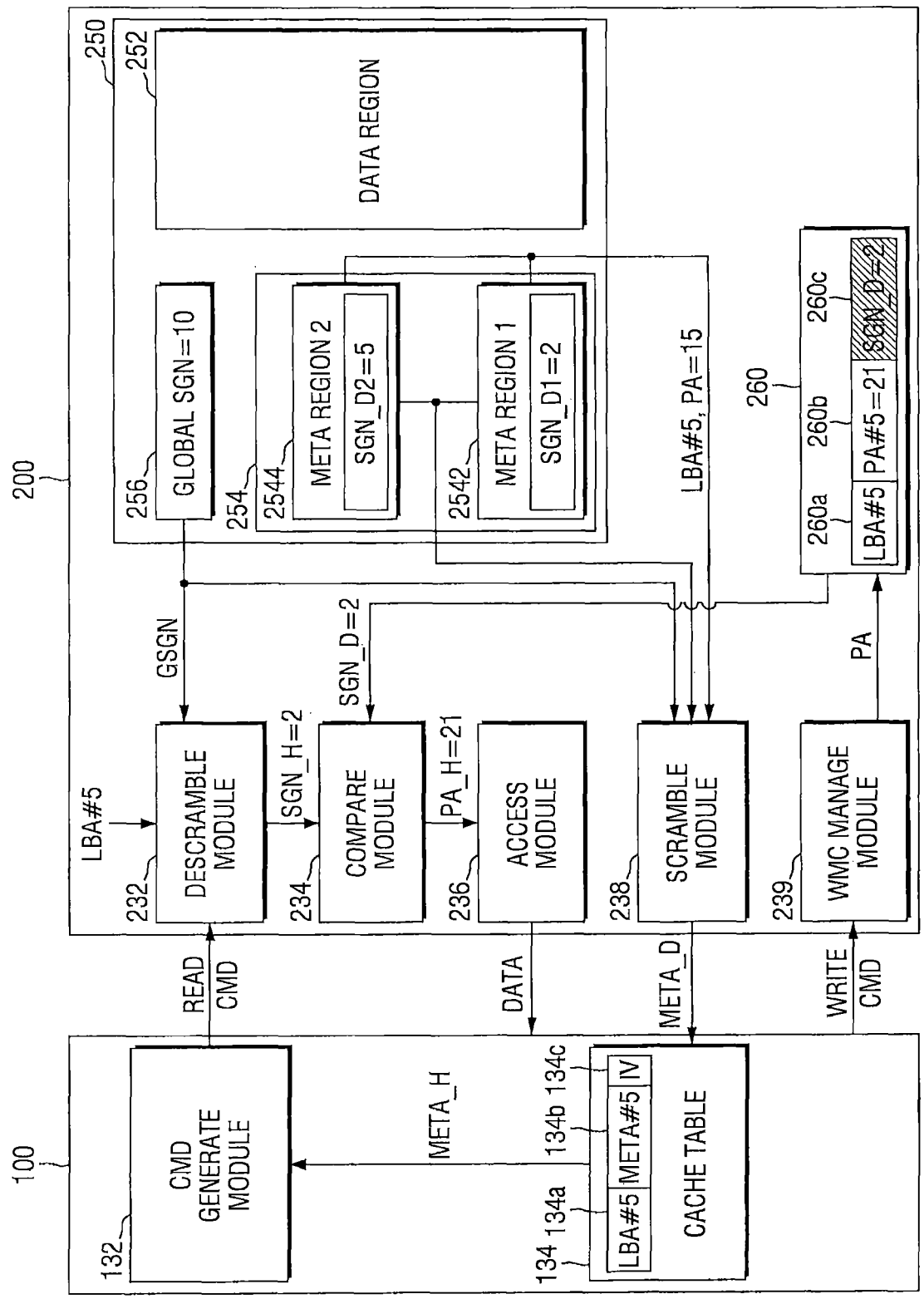
FIG. 10 is a block diagram that illustrates a configuration and operation of the host and the storage device according to an embodiment of the present disclosure.

FIG. 10 is a block diagram for explaining the operation of the host and the storage device according to an embodiment of the present disclosure. Referring to FIG. 10, in this embodiment, the command generate module 132 of the host 100 generates the read command READ CMD including the LBA information 300a of the LBA #5, and the first meta information META_H, 300b provided from the cache table 134. Further, the command generate module 132 transmits the read command READ CMD to the storage device 200.

The descramble module 232 of the storage device 200 receives the read command READ CMD from the host 100, and descrambles the first meta information META_H to acquire the first signature information SGN_H and the first PA information PA_H for accessing the flash memory 250. In the present embodiment, it is assumed that the value of the first signature information SGN_H acquired by descrambling the first meta information META_H is 2, and the value of the first PA information PA_H is 21.

The compare module 234 of the storage device 200 compares the value of the first signature information SGN_H acquired by descrambling the first meta information META_H with the value of the second signature information SGN_D stored in advance. Unlike the case of FIG. 7, in the present embodiment, the compare module 234 compares 2 as the value of the first signature information SGN_H with 2 as the value stored in the write map cache table 260 to determine the validity of the first PA information PA_H acquired by descrambling the first meta information META_H.

Since the value of the first signature information SGN_H is the same as the value of the second signature information SGN_D stored in the write map cache table 260, the access module 236 of the storage device 200 considers that the first PA information PA_H acquired by descrambling the meta information META_H is valid, accesses the data region 252 of the flash memory 250 using the same, and transmits the accessed data to the host 100.

Figure 11:
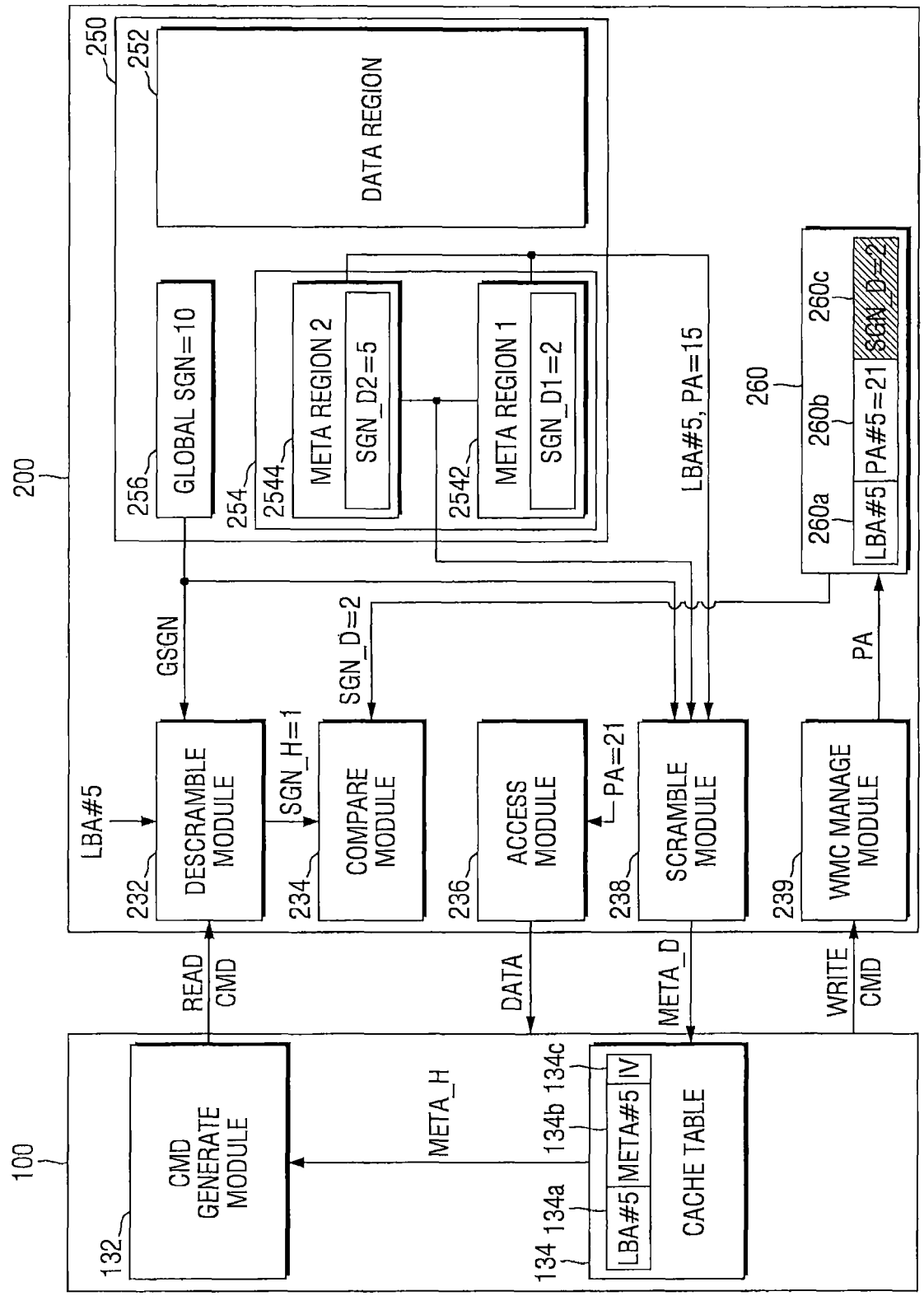
FIG. 11 is a block diagram that illustrates a configuration and operation of the host and the storage device according to an embodiment of the present disclosure.

FIG. 11 is a block diagram for explaining the operation of the host and the storage device according to the embodiment of the present disclosure. Referring to FIG. 11, this embodiment is different from the embodiment of FIG. 10 in that the value of the first signature information SGN_H acquired by descrambling the first meta information META_H is 1, and the value of the first PA information PA_H is 15.

As in the embodiment of FIG. 10, the command generate module 132 of the host 100 generates the read command READ CMD including the LBA information 300a of the LBA #5 and the first meta information META_H, 300b provided from the cash table 134, and transmits the read command READ CMD to the storage device 200.

The descramble module 232 of the storage device 200 receives the read command READ CMD from the host 100, and descrambles the first meta information META_H to acquire the first signature information SGN_H and the first PA information PA_H for accessing the flash memory 250.

The compare module 234 of the storage device 200 compares the value of the first signature information SGN_H acquired by descrambling the first meta information META_H with the value of the second signature information SGN_D stored in advance. Unlike the case of FIG. 8, in this embodiment, the compare module 234 compares 1 as the value of the first signature information SGN_H, with 2 as the value stored in the write map cache table 260 to determine the validity of the first PA information PA_H acquired by descrambling the first meta information META_H.

Since the value of the first signature information SGN_H and the value of the second signature information SGN_D are different from each other (i.e., 1≠2), the access module 236 of the storage device 200 considers that the first meta information META_H acquired by descrambling the first PA information PA_H is invalid. As a result, the access module 236 accesses the data region 252, using the second PA information newly loaded from the flash memory 250, instead of the first PA information PA_H, and transmits the accessed data to the host 100.

Figure 12:
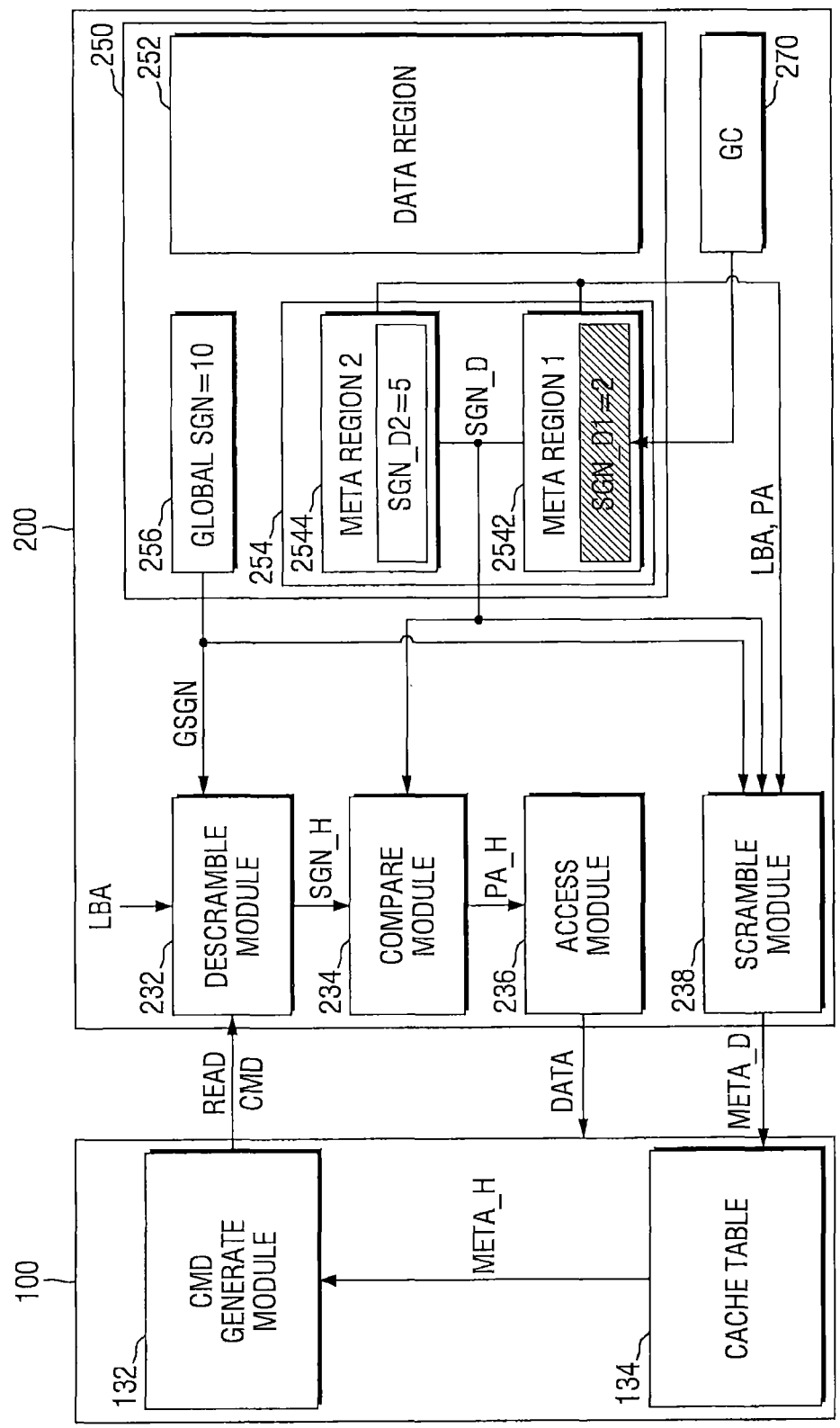
FIG. 12 is a block diagram that illustrates a configuration and operation of the host and the storage device according to an embodiment of the present disclosure.
Figure 13:
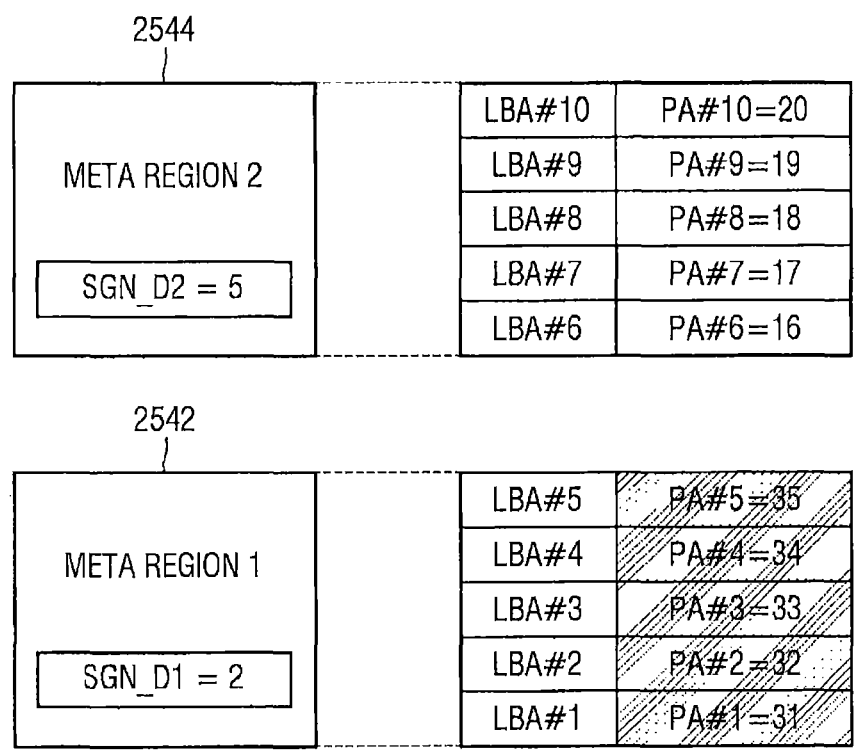
FIG. 13 is a schematic diagram for explaining an example of the meta region of FIG. 12.

FIG. 12 is a block diagram for explaining the operation of the host and the storage device according to the embodiment of the present disclosure, and FIG. 13 is a block diagram for explaining an example of the meta region of FIG. 12. Referring to FIG. 12, the garbage collection may be performed on the data region 252 of the storage device 250. The garbage collection may be performed in the entire regions of the data region 252, or may be performed in some regions. In this case, the previous LBA-PA mapping relation on the region of the data region 252 in which the garbage collection is executed may be entirely invalidated.

In the present embodiment, the storage device 250 may further include a garbage collection module (GC module) 270. When the garbage collection is performed on at least a part of the data region 252, the garbage collection module 270 changes the value of the first meta region signature information SGN_D1 or the second meta region signature information SGN_D2. For example, referring to FIG. 12 and FIG. 13 together, it is possible to know that the values of PA #1 to PA #5 for LBA #1 to LBA #5 corresponding to the first meta region 2542 are changed, and the garbage collection module 270 changes the value of the first meta region signature information SGN_D1 from 1 to 2, accordingly.

As a result, the cached PA provided from the host 100 for the LBA affected by the garbage collection is handled as an inevitably invalid value, and thereafter, the storage device 250 accesses the data region 252, using the second PA information newly loaded from the flash memory 250.

Figure 14:
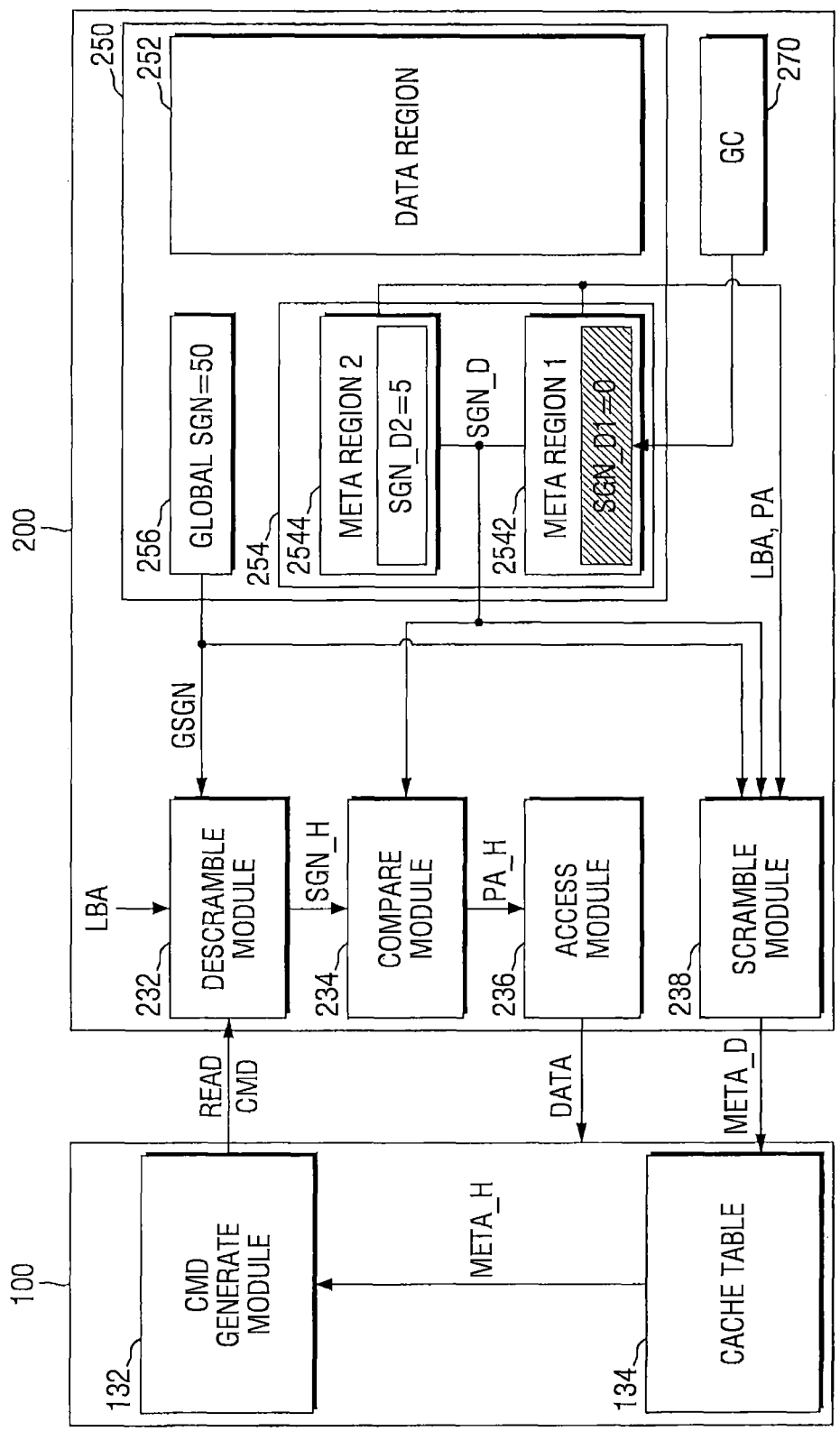
FIG. 14 is a block diagram that illustrates a configuration and operation of the host and the storage device according to an embodiment of the present disclosure.

FIG. 14 is a block diagram for explaining the operation of the host and the storage device according to the embodiment of the present disclosure. Referring to FIG. 14, as in the embodiment of FIG. 12, when the garbage collection is performed on the entire region or a partial region of the data region 252 of the storage device 250 and the garbage collection module 270 changes the value of the first meta region signature information SGN_D1 or the second meta region signature information SGN_D2, an overflow may occur.

For example, when the value of the first meta region signature information SGN_D1 is expressed by n bits, values that the first meta region signature information SGN_D1 may have are in the range of 0 to $2^n-1$. When n is 4, the values that the first meta region signature information SGN_D1 may have are in the range of 0 to 7.

When the garbage collection module 270 increases by 1 to change the value of the first meta region signature information SGN_D1, if the value is a value of 2n out of range, the value may not be expressed by n bits. Therefore, when the value of the first meta region signature information SGN_D1 or the second meta region signature information SGN_D2 is changed and an overflow condition occurs. In response, the garbage collection module 270 resets the value of the changed first meta region signature information SGN_D1 or the second meta region signature information SGN_D2 to, for example, 0. In addition, when the value of the first meta region signature information SGN_D1 or the second meta region signature information SGN_D2 is changed and an overflow occurs, the garbage collection module 270 changes the value of the global signature information GSGN to another value. For example, the value of the global signature information GSGN is changed from 10 to 50, as shown by FIG. 14.

Thus, as described above, and according to various embodiments of the present disclosure, it is possible to inspect the validity of the cached PA provided by the host in a simple and highly efficient manner, in the architecture in which the host operates to cache PAs of the storage device.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A storage device comprising:
   a non-volatile memory including a data region and a meta region;
   a controller coupled to the non-volatile memory comprising:
      a descramble module configured to receive a read command including logical block address (LBA) information and first meta information from a host, and to descramble at least a portion of the read command into first signature information and first physical address (PA) information for accessing the non-volatile memory, wherein the first meta information includes the first signature information and the first PA information, and is scrambled data generated in the storage device by scrambling the first signature information and the first PA information and transmitted to the host from the storage device;
      a compare module configured to compare the first signature information with a second signature information previously stored in the meta region prior to the read command being received by the descramble module, to determine the validity of the first PA information; and
      an access module configured to use the first PA information to access the data region of the nonvolatile memory when it is determined that the first PA information is valid;
   a flash storage interconnection layer that is coupled to the controller and the host; and
   a buffer memory for temporarily storing data stored in the data region.

2. The storage device of claim 1, wherein the access module is further configured to load second PA information from the non-volatile memory and access the data region using the second PA information when it is determined that the first PA information is not valid.

3. The storage device of claim 1, wherein the descramble module descrambles the first meta information, using the LBA information and global signature information.

4. The storage device of claim 1, further comprising:
   a scrambling module connected with the meta region and the compare module, configured to scramble the second signature information and second PA information associated with the second signature information using the global signature to thereby generate second meta information.

5. The storage device of claim 4, wherein the scrambling module provides the second signature information stored in the storage device to the host.

6. The storage device of claim 1, further comprising:
   a WMC management module configured to receive a write command from the external device and to manage a PA information and a signature information associated with a LBA information included in the write command, using a write map cache (WMC) table, when the write command is received at the storage device from the host.

7. The storage device of claim 1,
   wherein the meta region includes a first meta region and a second meta region,
   wherein the first meta region stores first meta region signature information on a first LBA set and the second meta region stores second meta region signature information on a second LBA set different from the first LBA set, and
   wherein the second signature information is equivalent to the first meta region signature information or the second meta region signature information in accordance with a value of the LBA information.

8. The storage device of claim 1, wherein the universal flash storage interconnection layer is configured to receive the read command including the logical block address (LBA) information and the first meta information and provide the read command to the descramble module.

9. A method for operating a storage device, the method comprising:
   transmitting a first meta information including a first physical address (PA) information and a first signature information in the storage device to a host;
   receiving a read command including logical block address (LBA) information and the first meta information from the host;
   descrambling the first meta information to acquire the first signature information and the first PA information for accessing a non-volatile memory; and
   comparing a value of the first signature information with a value of the second signature information that was previously stored in the non-volatile memory before the read command was received from the host, to determine validity of the first PA information.

10. The method for claim 9, wherein determination of the validity comprises:
    determining that the value of the first PA information is valid when the value of the first signature information is equal to the value of the second signature information; and
    determining that the value of the first PA information is invalid when the value of the first signature information is different from the value of the second signature information.

11. The method for claim 9, further comprising:
    accessing a data region of the non-volatile memory, using the first PA information, when the first PA information is determined to be valid; and
    loading second PA information from the non-volatile memory and accessing the data region using the second PA information, when the first PA information is determined to be invalid.

12. The method for claim 9, wherein the non-volatile memory includes a meta region which stores the second signature information; and wherein determination of validity includes comparing the value of the first signature information with the value of the second signature information stored in the meta region to determine validity of the first PA information.

13. The method for claim 12, wherein the meta region includes a first meta region and a second meta region, the first meta region stores first meta region signature information on a first LBA set, the second meta region stores second meta region signature information on a second LBA set distinguished from the first LBA set; and wherein the second signature information is determined as the first meta region signature information or the second meta region signature information in accordance with a value of the LBA information.

14. The method for claim 9, further comprising:
generating the first meta information by scrambling the first PA information and the first signature information in the storage device.

15. The method for claim 14, wherein the scrambling the first PA information and the first signature information is performed by using the LBA information and global signature information in the storage device.

16. The method for claim 9, further comprising:
receiving a write command from the host; and
inserting PA information and signature information associated with the LBA information included in the write command into a write map cache (WMC) table.

17. The method for claim 16, wherein determination of the validity comprises:
comparing the value of the first signature information with the value of the second signature information stored in the write map cache table to determine the validity of the first PA information.

18. A method for operating a storage device, the method comprising:
generating a first meta information by scrambling a first physical address (PA) information and the first signature information in the storage device;
transmitting the first meta information to a host;
receiving a read command including logical block address (LBA) information and the first meta information from the host;
descrambling the first meta information to acquire the first signature information and the first PA information for accessing a flash memory;
comparing a value of the first signature information with a value of the second signature information that was previously stored in a meta region of the flash memory before the read command was received from the host, to determine validity of the first PA information;
accessing a data region of the flash memory, using the first PA information, when the first PA information is determined to be valid; and
loading second PA information from the flash memory and accessing the data region using the second PA information, when the first PA information is determined to be invalid.

19. The method for claim 18, wherein the scrambling the first PA information and the first signature information is performed by using the LBA information and global signature information in the storage device.

20. The method for claim 18, wherein the read command from the host is received through a universal flash storage interconnection layer.

* * * * *